United States Patent Office 3,166,274
Patented Jan. 19, 1965

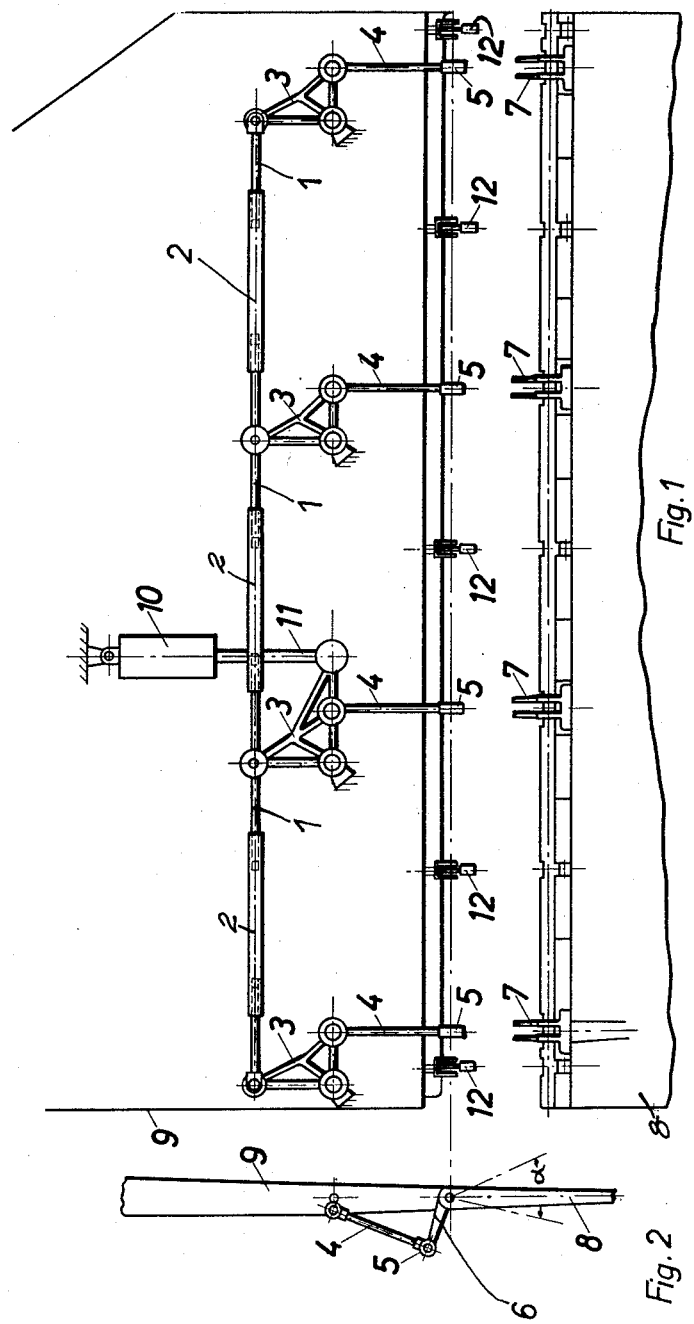

3,166,274
PRE-TENSIONED CONTROL SYSTEM FOR CONTROL SURFACES OF AN AIRCRAFT
Willy Messerschmitt, Munich, Germany, assignor to Messerschmitt A.G., a corporation of Germany
Filed Mar. 25, 1963, Ser. No. 267,417
Claims priority, application Germany, Apr. 28, 1962, M 52,672
4 Claims. (Cl. 244—75)

This invention concerns a control system for the rudder and flaps of aircraft and has for its object the abolition of play thereby increasing the vibrational safety margin.

The continuously increasing speeds of modern aircraft require additional measures to increase the vibrational safety margin, particularly with respect to the behaviour of the movable control members of the aircraft, for example the nose flaps, landing flaps, rudder, ailerons, elevators, other auxiliary control surfaces of all kinds.

The required aero-elastic extensive irreversibility of these control surfaces is of an extent that can very often only be obtained with great difficulty. In practice, one must endeavor to make the natural frequency of rotation of the control surfaces round their axles as high as possible. In modern aircraft, the control surfaces have natural frequencies which may be double the amount of the natural rotational frequencies of the rigid main surfaces such as wings or floats, to which they are connected. An hydraulically actuated control cylinder forms auxiliary means for this purpose; however, difficulties can still arise in as far as the system connecting the cylinder or cylinders with the control surface due to unavoidable tolerances or to the sum of play present in each pivot, produces a great reduction in the rigidity and therefore of the natural frequency.

Arrangements have become known in which the rudders are directly actuated through a large number of small hydraulic cylinders disposed on the span. However in this the hydraulic system is complicated, the expense in weight considerable and the constructional arrangement not always possible.

The invention overcomes these disadvantages at least to some extent by a control system which is actuated by one or more hydraulic cylinders or some other irreversible mechanical drive, for example, a worm and which can be pre-tensioned by suitable means.

The invention will be apparent from the following description, with reference to the accompanying drawings, which show, by way of example only, in diagrammatic form, one form of control system embodying the invention.

Of the drawings:

FIG. 1 shows a plan view of a flap and its associated parts; and

FIG. 2 shows an end view of the flap of FIG. 1.

Referring now to the drawings, the flap which is generally indicated by the reference numeral 8 is pivotally connected to the main surface 9 by pivotal bearings 12.

The flap 8 is adapted to be controlled by a single hydraulic cylinder 10, which is pivotally secured to a rigid frame member within the surface 9, and whose piston rod 11 is pivotally secured to one arm of a bell-crank lever 3. The other arm of the bell-crank lever 3 is pivotally connected to a rod 1 which extends in a direction parallel to the adjacent edge of the flap 8. Further bell-crank levers 3 are provided and all have one arm pivotally connected with the rod 1. A turnbuckle 2 is provided in the rod 1 between each pair of adjacent bell-crank levers 3. Each bell crank lever 3 (including that which is connected with the hydraulic cylinder 10) has a link 4 pivotally secured thereto on the arm thereof remote from the rod 1. A lever 6 is pivotally connected at one end by a bearing 5 to each rod 4, and the ends of the levers 6 remote from the rods 4 are carried in bearings 7 secured to the flap 8.

By operation of the turnbuckles 2, the flap 8 may be brought into the aerodynamic null position by actuation of the rod 1, bell-crank levers 3, rods 4 and levers 6. Actuation of the flap 8 is effected by operation of the hydraulic cylinder 10, movement of the piston rod 11 causing operational movement of the flap 8 through the bell-crank levers 3 rods 4 and levers 6.

Thus the flap 8 can be deflected to any desired position within the range of the angle $\alpha$ (see FIG. 2). The pre-tension produced in the control system by the turnbuckles 2 is taken up by the flap 8, which is urged by each turnbuckle and by the pair of bell-crank levers 3 connected thereto to turn simultaneously in opposite directions. Flap 8 should always be relatively rigid and is therefore constructed in such a manner that it is initially brought into its aerodynamic null position by the tensioning of the control system.

The pre-tensioning moment acting on the control system must be of such magnitude that it is not completely compensated or reversed by air pressure or on actuation of the flap 8. On fulfillment of this condition the play arising in the control system controlling the flap is eliminated and operation of the hydraulic cylinder is decisive for the rotational rigidity and consequently for the natural frequency of the flap, regardless of the connection positions of the hydraulic cylinder.

It will be appreciated that it is not intended to limit the scope of the invention to the above example only, many variations such as might occur to one skilled in the art, being possible without departing from the principles of the invention.

What I claim is:

1. A control system for an aircraft, comprising, in combination, a control member such as a rudder, flap, aileron or elevator; mounting means for mounting said control member on the aircraft for turning movement about an axis between two end positions and an intermediate neutral position; pre-tensioning means including at least two tensioning members connected to said control member at points spaced along said axis, bell-crank levers connected to said tensioning members, threaded rod means and turnbuckle means connecting said bell-crank levers, said turnbuckle means being adjusted so that said tensioning members with said control member are urged in opposite directions whereby said control member is pre-tensioned; and actuating means connected to said rod means for moving the same so that said control member is moved between said positions thereof in a pre-tensioned condition in which the natural frequency thereof is increased.

2. A control system for an aircraft, comprising, in combination, a control member such as a rudder, flap, aileron or elevator; mounting means for mounting said control member on the aircraft for turning movement about an axis between two end positions and an intermediate neutral position; pre-tensioning means including at least two tensioning members connected to said control member at points spaced along said axis, bell-crank levers connected to said tensioning members threaded rod means and turnbuckle means connecting said bell-crank levers, said turnbuckle means being adjusted so that said tensioning members with said control member are urged in opposite directions whereby said control member is pre-tensioned; and hydraulic actuating means including a piston and a cylinder, and being connected to said rod means for moving the same so that said control member is moved between said positions thereof in a pre-tensioned condition in which the natural frequency thereof is increased.

3. A control system for an aircraft comprising, in combination, a support; a control member such as a rudder, flap, aileron or elevator; pivot means on said support for mounting said control member for angular movement about an axis between two end positions and an intermediate position; a plurality of links connected to said control member at points spaced along said axis and being displaceable for turning the same about said axis; a plurality of bell-crank levers having respectively parallel first and second arms, said first arms being respectively connected to said links; a plurality of pivot means secured to said support in a row parallel to said axis and supporting said bell-crank levers for turning movement about parallel axes perpendicular to said axis; threaded rod and turnbuckle means extending parallel to said axis of said control member and connecting said second arms of adjacent bell-crank levers so that upon adjustment of each turnbuckle means said adjacent bell-crank levers are urged in opposite directions to urge said control member through said links in opposite directions out of said neutral position whereby said control member is pre-tensioned; and actuating means secured to said support and including a reciprocating self-locking member connected to said first arm of one of said bell-crank levers for turning all of said bell-crank levers while said rod and turnbuckle means move together parallel to said axis whereby said control member is angularly displaced between said positions thereof in a pre-tensioned condition in which the natural frequency thereof is increased.

4. A control system as set forth in claim 3 wherein said actuating means comprises a hydraulic cylinder, a piston slidable in said cylinder and a piston rod connected to said piston and pivotally connected to said first arm of said one bell-crank lever.

References Cited by the Examiner
UNITED STATES PATENTS

| | | | |
|---|---|---|---|
| 2,402,001 | 6/46 | Zap | 244—83 X |
| 2,679,367 | 5/54 | Pribil et al. | 244—82 |
| 2,721,714 | 10/55 | Clifton | 244—85 |

MILTON BUCHLER, *Primary Examiner.*